United States Patent
Abbestam et al.

(10) Patent No.: US 6,913,139 B2
(45) Date of Patent: Jul. 5, 2005

(54) CONVEYOR, AND CONNECTION PIECE FOR CONVEYOR BEAM SIDES

(75) Inventors: Göran Abbestam, Partille (SE); Andreas Rundqvist, Floda (SE)

(73) Assignee: Flexlink Components AB (SE)

( * ) Notice: Subject to any disclaimer, the term of this patent is extended or adjusted under 35 U.S.C. 154(b) by 0 days.

(21) Appl. No.: 10/480,336

(22) PCT Filed: Jun. 7, 2002

(86) PCT No.: PCT/SE02/01101
§ 371 (c)(1),
(2), (4) Date: Jul. 16, 2004

(87) PCT Pub. No.: WO02/100746
PCT Pub. Date: Dec. 19, 2002

(65) Prior Publication Data
US 2004/0238334 A1 Dec. 2, 2004

(30) Foreign Application Priority Data
Jun. 13, 2001 (SE) .............................................. 0102091

(51) Int. Cl.[7] .............................................. B65G 21/08
(52) U.S. Cl. .............................. 198/860.1; 198/861.1; 198/836.1
(58) Field of Search .............................. 198/836.1, 837, 198/841, 860.1, 860.2, 860.3, 861.1

(56) References Cited

U.S. PATENT DOCUMENTS

| | | | |
|---|---|---|---|
| 4,013,167 A | | 3/1977 | Bourgeois |
| 4,967,897 A | * | 11/1990 | Lachonius et al. .......... 198/841 |
| 5,131,531 A | * | 7/1992 | Chambers ................ 198/860.2 |
| 5,443,151 A | | 8/1995 | Taylor |
| 5,755,246 A | * | 5/1998 | Carl et al. .................... 134/73 |
| 6,283,038 B1 | * | 9/2001 | Mattila ........................ 104/89 |

FOREIGN PATENT DOCUMENTS

EP 0 203 352 A1 12/1986

* cited by examiner

Primary Examiner—James R. Bidwell
(74) Attorney, Agent, or Firm—Lerner, David, Littenberg, Krumholz & Mentlik, LLP

(57) ABSTRACT

Conveyor for light goods, and connection piece for beam sides of a conveyor. The conveyor has a first supporting guide arrangement (10) for controlling the conveyor chain (11) in an operational direction, a second guide arrangement (17) for controlling the conveyor chain in the return direction, and a deflector wheel arrangement (20) (FIG. 3) at both ends of the first and second guide arrangements. The first guide arrangement (10) is made up of beam sides (10a, 10b) which between them form a space which narrows in the direction towards the second guide arrangement (17). A two-part connection piece (12) which has a wedge-shaped element (12a) fixes the position of the beam sides by means of a wedging effect between the wedge-shaped-element of the connection piece and a complementary recess in the second element (12b) of the connection piece. A tensioning bolt (13) inserted at right angles between the plane of the conveyor chain of the guide arrangements generates said wedging effect. Between the beam sides (10a, 10b) there is a drainage gap (15), and the underside of the conveyor chain is protected against contamination by the base part of the second guide arrangement (17) shaped as a U-beam.

13 Claims, 6 Drawing Sheets

CONVEYOR, AND CONNECTION PIECE FOR CONVEYOR BEAM SIDES

TECHNICAL FIELD

The invention relates to conveyors intended for light goods, for example goods in the form of food products packed in consumer packages.

PRIOR ART

Conveyors of the type in question include some form of endless chain or belt whose weight is supported by and which is controlled in a guide arrangement in a first direction, an operational direction. At both ends of the operational conveyor belt there are deflector wheels which give the chain/belt the necessary return direction.

Hollow beams extruded in one piece with tailor-made inner profile and outer profile for producing guides for the operational belt and return belt for conveyor chains have been known for some time.

It is likewise known to produce conveyors based on beam constructions composed of beam sides.

These beam sides often have guide surfaces formed integrally with them and in themselves constitute an economical way of manufacturing conveyors for light goods, in the same way as said hollow beams extruded in one piece with inner and outer profiling.

However, both types of conveyors constructed from beam elements have certain shortcomings, particularly in applications where a high level of hygiene is needed and has to be maintained throughout operation.

The extruded, one-piece hollow beams with inner and outer profiling have, for example, internal spaces which are difficult to access for cleaning. The profiling additionally creates niches which gather dirt.

The conveyor beams constructed from beam sides all have some type of bolt connection passing across the space between the beam sides. In addition to such bolt connections being needed to build individual beam length sections, some are also needed for joining the length sections. Since the necessary operational length of conveyor beams varies from application to application, the construction of a complete conveyor system using such beams means that alternative attachment points for transverse bolt connections have to be arranged in the beam sides. This results in the prefabricated beam sides being formed with longitudinal openings or slits to permit alternative points of attachment for bolt connections.

The bolt connections together with the slits create points where dirt can gather and which can be difficult to access for cleaning purposes.

OBJECT OF THE INVENTION

The object of the invention is to make available a conveyor for light goods, where the conveyor satisfies stringent hygiene requirements, and where the conveyor, by means of self-draining during operation, maintains a high level of hygiene and, if need be, can be easily cleaned by simple means, without having to dismantle it and without having to interrupt operations.

THE INVENTION

The object of the invention is achieved with the conveyor defined in attached Patent claim 1, and advantageous developments and embodiments of the most important parts of the conveyor are set out in Patent claims 2–9.

Patent claims 11–13 concern the connection piece according to the invention for connecting the beam sides of the conveyor.

DESCRIPTION OF AN EMBODIMENT OF THE INVENTION

Figure 1:
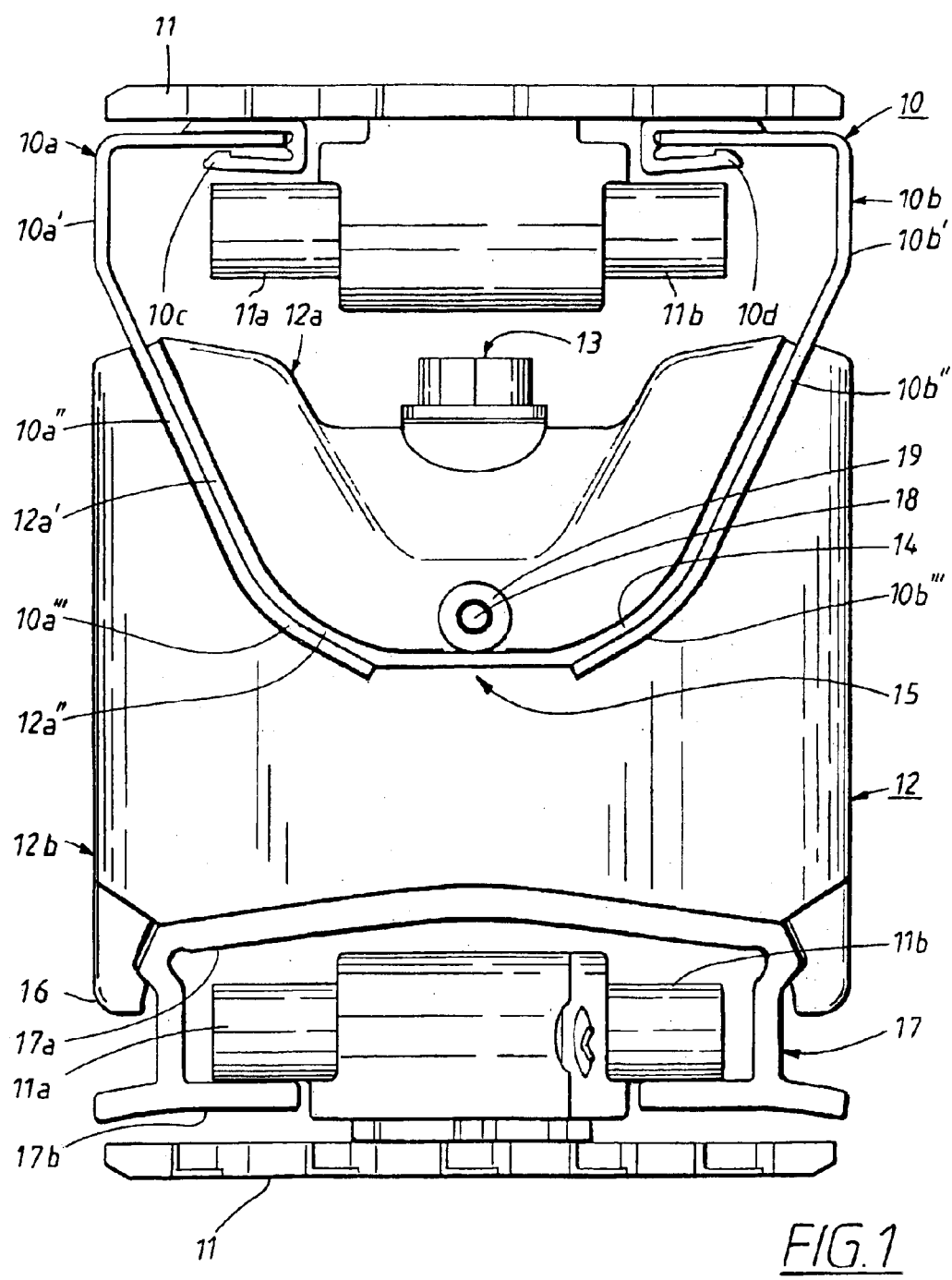
FIG. 1 is an outline diagram which at the top shows the conveyor guide for controlling the conveyor chain in the operational direction, and at the bottom shows the guide for the return direction. The figure also shows in outline the clamping arrangement which is located between said guides/beams for the beam sides included in the guide arrangement acting in the operational direction.

FIG. 1 shows in outline the structure of the operational track and the return track of a conveyor provided with an endless conveyor chain consisting of chain links.

Beams sides 10a, 10b, which in the illustrative embodiment are made of stainless steel and are of a standardized length or of a length tailored for a specific application, constitute the bearing parts of a guide arrangement 10 for the loadable operative part of the conveyor, i.e. the part on which the goods are transported, for example food products, e.g. milk, packed in consumer packages.

Chain links 11 lying on guide edges 10c, 10d form an endless conveyor. The chain links are in principle of the type which have considerable mutual flexibility in the mutually connected state and which between them form through-openings or passages. Each chain link 11 has a pair of rod-shaped members 11a, 11b which, in the upper guide arrangement 10, lie under and run under the guide edges 10c, 10c.

In FIG. 1, the beam sides 10a, 10b in the upper guide arrangement 10 have a substantially vertical upper portion 10a', 10b', a subsequent portion 10a", 10b" sloping relatively steeply in towards the centre, and a less steeply sloping end portion 10a''', 10b'''. All these portions are plane and merge into one another without forming any dirt-accumulating niches.

To maintain the beam sides 10a, 10b in the position shown in FIG. 1, there are one or more connection pieces 12 depending on the length of the beam sides. The connection piece 12 in FIG. 1 can be fitted in the desired position along the beam sides 10a, 10b without the need for holes in the beam sides and can also be used for joining adjacent beam sides.

The connection piece 12 comprises a first element 12a of substantially wedge-shaped external form in the parts 12a', 12a", and, as seen in FIG. 1, with angles of convergence or inclination corresponding substantially to the angles of convergence or inclination of the sloping beam side portions 10a'', 10a'''.

The connection piece 12 also comprises a second element 12b of the "female type" with a recess directed towards the element 12a and with a shape substantially complementing said external form of the element 12a.

The outer design of the first element 12a of the connection piece, i.e. the shape as viewed from the operative chain part, is gently sloping and rounded off without niches. The corresponding outer design of the second element 12b of the connection piece comprises only smooth and substantially vertical surfaces.

The two elements 12a, 12b of the connection piece 12 together form a unit which, in the state with the beam sides fitted, constitutes a self-draining connection piece, i.e. a connection piece without dirt-accumulating niches, and which, together with the beam sides 10a, 10b shaped in the manner described and leaving a drainage gap between them, gives a self-draining operative conveyor guide arrangement.

As can be seen in principle in FIG. 1, there is a vertical securing element 13 in the form of a tensioning bolt extending centrally through the elements 12a and 12b of the connection piece. This tensioning bolt tightens the elements 12a, 12b together and clamps the beam sides 10a, 10b between them with a wedge effect. The securing element 13 thus acts in a direction at right angles to the plane of the operative chain part. In the embodiment shown, a seal 14 is inserted between cooperating surfaces 10a'', 12a'; 10b'', 12a' and 10a''', 12a''; 10b''', 12a'' on the respective beam side 10a, 10b and the element 12a. The sealing element 14 also extends across the lower horizontal portion of the element 12a in FIG. 1.

With the described embodiment of beam sides 10a, 10b and connection piece 12, the beam sides forming the operative chain guide are thus clamped securely together while leaving, as can be seen in FIG. 1, a gap 15 between the lower longitudinal edges of the beam sides.

Formed between the beam sides 10a, 10b there is a space, in principle wedge-shaped, which narrows in the direction towards the gap 15 and which has plane sloping surfaces, where any spillage from the product on the operative part of the chain 11 can freely flow from the chain to the gap 15. This gap 15 is interrupted only by, depending on the embodiment, one or more connection pieces 12 which, as has been mentioned above however, are of the self-draining type and thus give the whole beam construction a self-draining character despite the presence of these connection pieces.

The second element 12b of the connection piece 12 has, at the bottom, a pair of bracket-like holders 16 which, in the illustrative embodiment shown, are produced separately and are screwed onto the element 12b. A second chain guide arrangement in the form of a return beam 17 for controlling and supporting the conveyor chain in the return direction is held in these holders 16. This return beam is in principle U-shaped and has the outside of its base part 17a directed towards the gap 15. The pins 11a, 11b of the chain links slide on the inwardly directed flanges 17b of the return beam 17. The return beam thus screens the underside of the conveyor chain from any contamination originating from spillage passing through the gap 15.

As FIG. 1 shows in principle, two small pins 18 (of which only one can be seen in the figure) are located centrally on the element 12a of the connection piece 12, near to the lower plane portion of the element 12a. These pins 18 are oriented in the longitudinal direction of the beam sides 10a, 10b and are intended to support an elongate element 19, in this embodiment a pipe of relatively small diameter, between adjacent connection pieces 12 or between a connection piece 12 and another arrangement along the conveyor, for example an end piece with deflector wheel. These elongate elements 19, which in FIG. 1 lie above the gap 15, reduce the gap width, as viewed from below in the figure, but still leave, at each connection piece 12 and along the whole gap between connection pieces or equivalent, a flow passage for contaminants and of course the cleaning agent which may be used, for example pressurized water or steam.

The elongate element 19 serves as protection against fingers or the like being inserted into the inside of the space between the beam sides.

Having described the basic structure of the load-bearing guide arrangement 10 of the conveyor, its return beam guide arrangement 17 and its connection piece 12, reference is now made to FIGS. 2–7 for further explanation of the construction.

Figure 2:
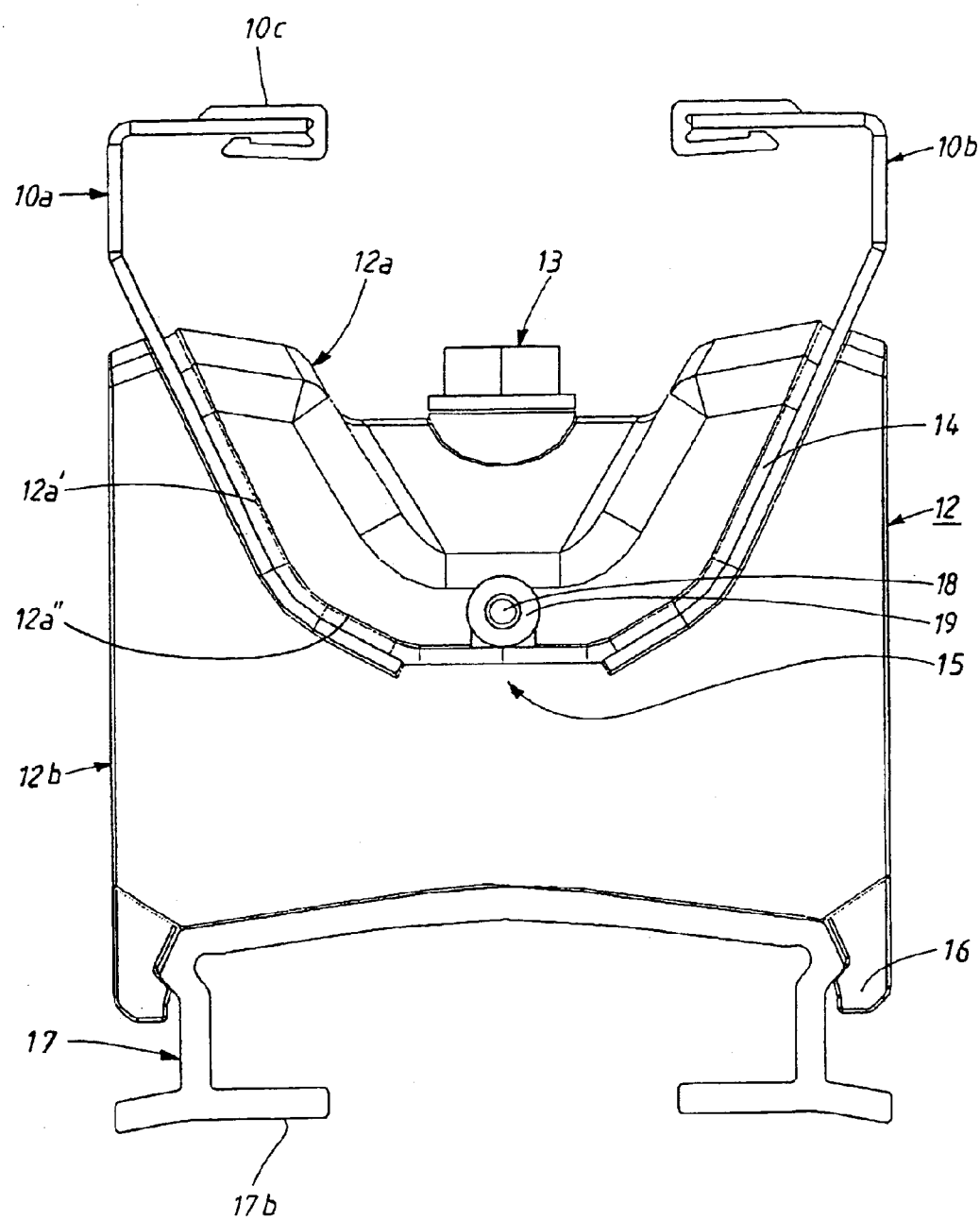
FIG. 2 shows the arrangement from FIG. 1 more clearly, but without conveyor chain links.

FIG. 2 corresponds in principle to FIG. 1, with the only difference that the chain links have been omitted and that FIG. 2 has been originally created by black/white CAD technology. The picture in FIG. 1 is created using colour CAD and shows slightly more clearly the smoothly rounded self-draining form of the wedge-shaped element 12a of the connection piece.

Figure 3:
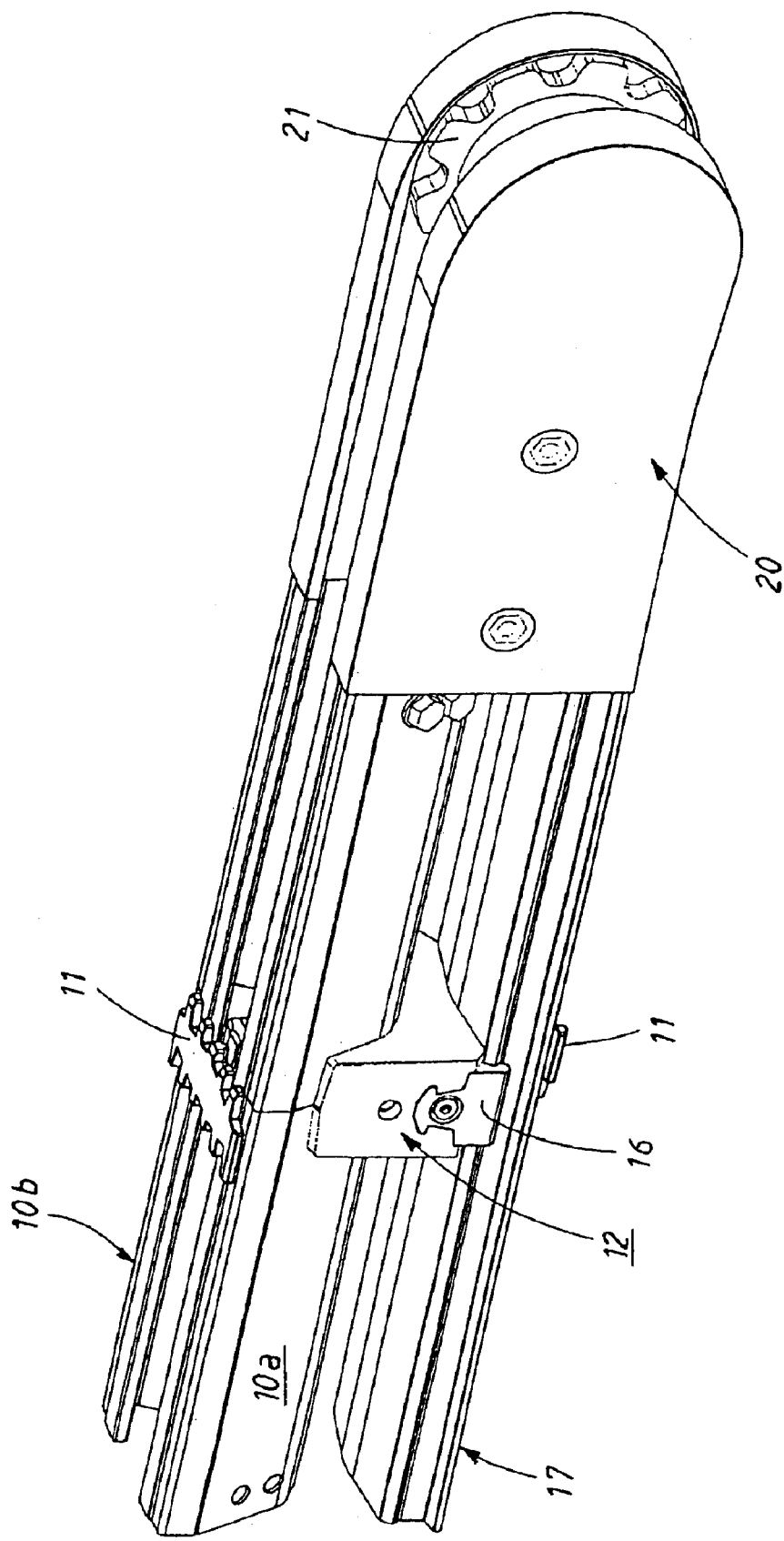
FIG. 3 shows, in perspective view, part of a conveyor according to an embodiment of the invention provided with an end piece containing deflector wheels.

FIG. 3 shows two beam side lengths 10a, 10b joined together by means of the connection piece 12, and a chain return piece 20 at one end of the conveyor. At the other end of the conveyor there is a corresponding return piece which, like the conveyor frame, has not been shown in the figures.

From what has been described, it should already be clear that such a frame is normally arranged to support the chain parts, the operative part and the return part in a horizontal plane.

FIG. 3 shows clearly that the return beam 17, i.e. the beam protecting the underside of the chain from contamination, has the same longitudinal extent as the beam sides 10a, 10b.

FIG. 3 also shows a deflector wheel 21 (another one is located in the encased part). The pins 11a, 11b on the chain links engage in recesses in these deflector wheels. The conveyor chain is normally driven at one end by means of the deflector wheels being provided with drive axles.

Figure 4:
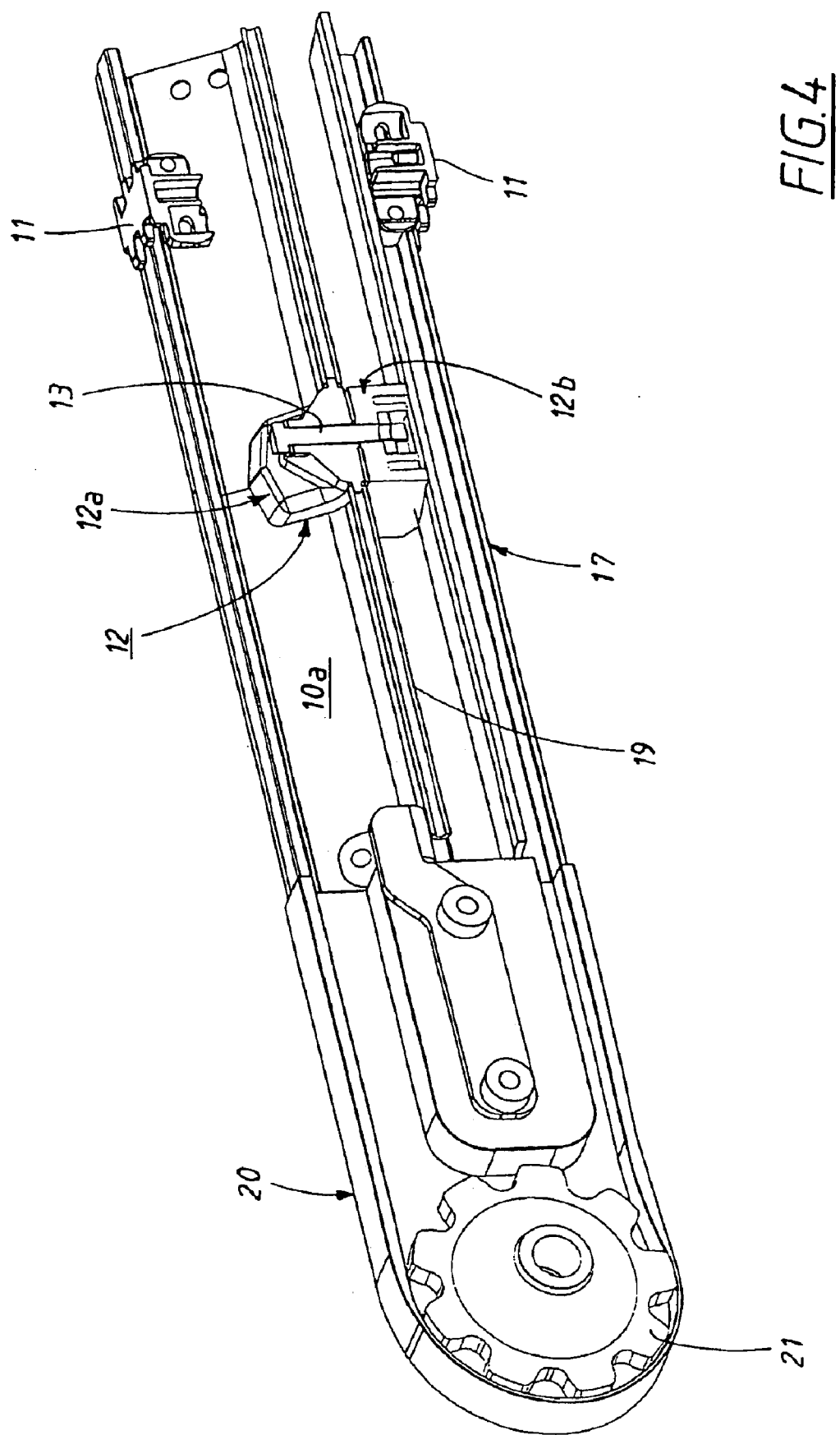
FIG. 4 shows the arrangement from FIG. 3 in sectional view in the longitudinal direction.

FIG. 4 is a longitudinal section through the arrangement in FIG. 3 and shows clearly the details/elements described in connection with FIG. 1. It will be seen, for example, that the element 19 protecting against insertion of fingers or the like extends all the way to the end piece and joins the latter.

Figure 5:
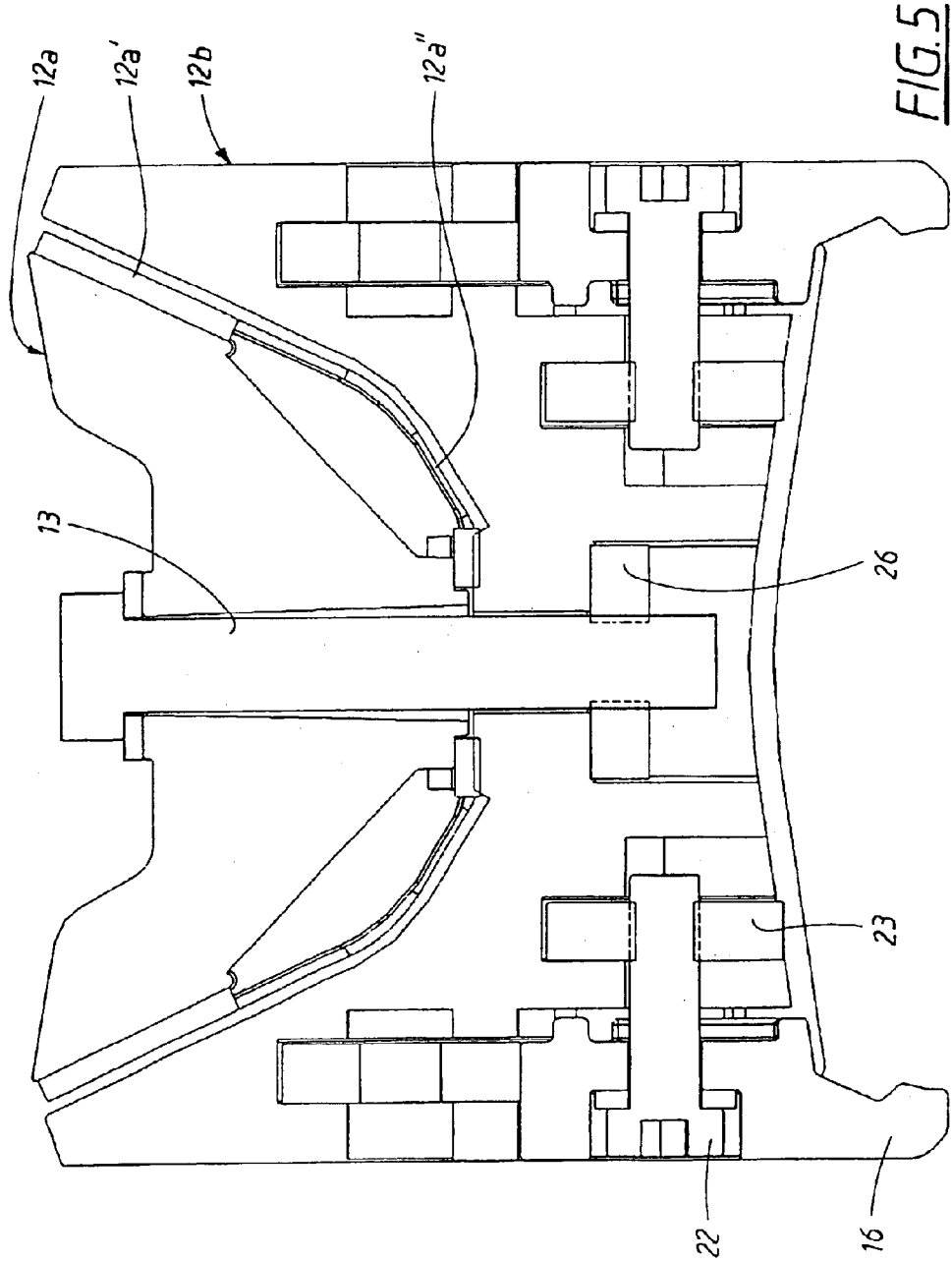
FIG. 5 is a cross section through a tensioning arrangement/connection piece in one embodiment thereof.
Figure 6:
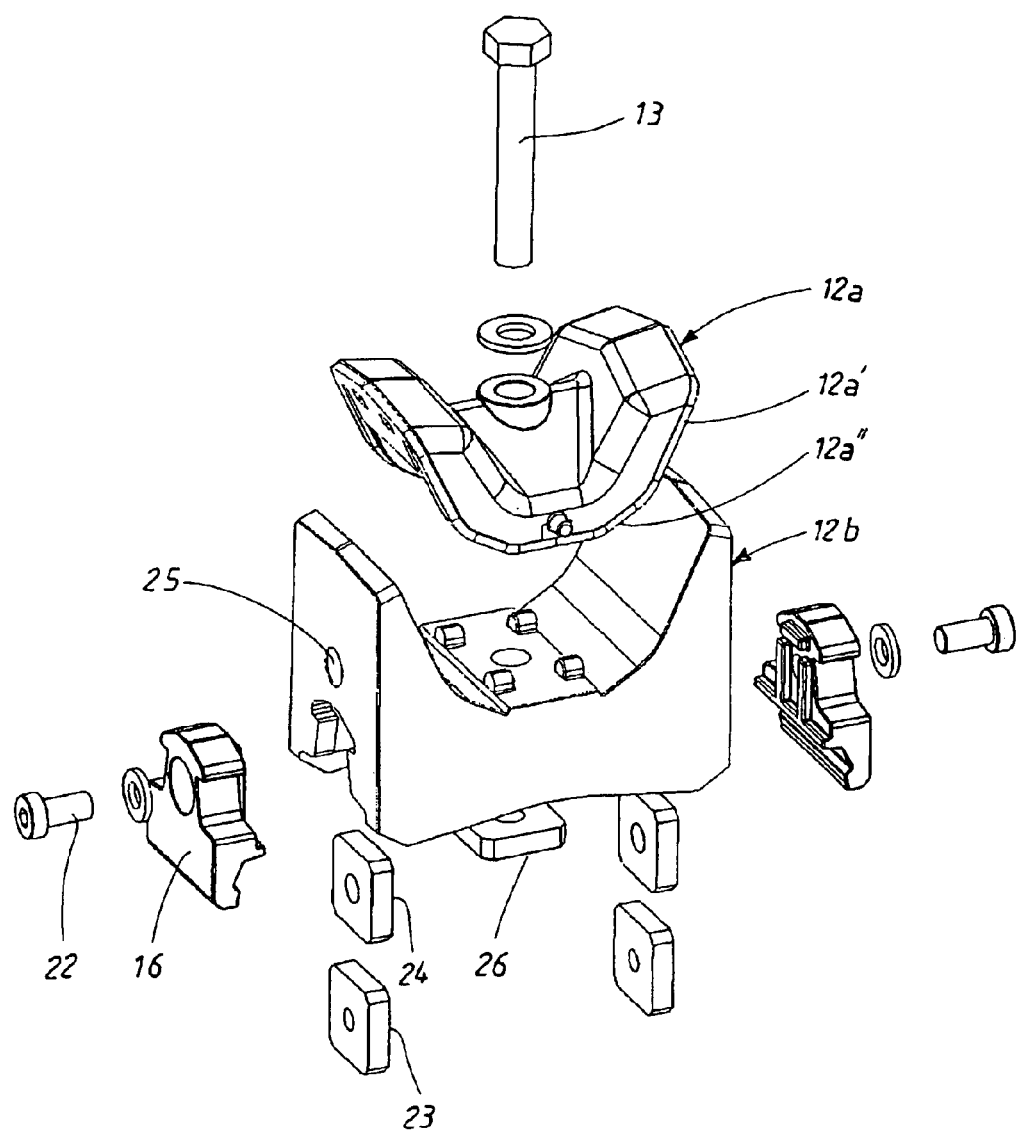
FIG. 6 shows the tensioning arrangement/connection piece from FIG. 5 in an exploded view.

FIG. 5 together with FIG. 6 shows in detail the structure of a connection piece according to the invention.

FIG. 6 shows, for example, that the brackets 16 supporting the return beam are produced separately and can be inserted into complementary recesses in the element 12b. The brackets are secured with bolts 22 which are engaged in square nuts 22 which are held inside corresponding recesses in the element 12b.

A further square nut 24 is shown which is intended to be placed inside the opening 25 so that, together with a bolt, it will support a vertical post serving as a pillar of a rail extending along the operative part of the conveyor.

The tensioning bolt 13 shown in FIG. 1 and discussed in connection with the latter has a corresponding square nut 26.

In the introduction, and in the description of the different figures in the drawing, mention has been made of certain design details, including choice of material, etc. However, it will be appreciated that the concept of the invention is not limited to the examples which have been given, and instead the invention is limited only by what is specified in the attached patent claims.

What is claimed is:

1. Conveyor for light goods, for example food products packed in consumer packages, comprising an endless conveyor chain (11), a supporting first guide arrangement (10) for controlling the conveyor chain in an operational direction with goods intended to be placed on the conveyor chain, a second guide arrangement (17) for controlling the conveyor chain in the return direction, and a deflector wheel arrangement (20) at both ends of the first and second guide arrangements, characterized in that:

the supporting guide arrangement comprises a pair of parallel elongate plate-shaped elements serving as beam sides (10, 10b), the beam sides between them form a space which at least partially narrows in the direction towards the second guide arrangement (17), at least one first element (12a), with an external shape corresponding to said narrowing space, bears directly or indirectly against the inside surfaces of the beam sides (10a, 10b), at least one second element (12b) at least partially adapted in shape surrounds said first element (12a) and accommodates, between itself and the first element, the pair of beam sides (10a, 10b), and a securing element (13) is arranged substantially at right angles to the plane of the conveyor chain of the first guide arrangement in order to tighten the first and second elements (12a, 12b) together and clamp the beam sides (10a, 10b) lying between them.

2. Conveyor according to claim 1, characterized in that said first guide arrangement (10) comprising the beam sides has a drainage gap (15) between the beam sides (10a, 10b) in the direction towards the second guide arrangement (17) along the entire length of the beam sides, with interruption for arrangement of said at least one first (12a) and second (12b) elements clamping the beam sides.

3. Conveyor according to claim 2, characterized in that the second guide arrangement (17), via part (17a) thereof, completely covers the underside of the conveyor chain on the side directed towards the drainage gap (15).

4. Conveyor according to claim 3, characterized in that the first (12a) and second (12b) elements clamping the beam sides are designed with niche-free external outer surfaces, of such shape and orientation that a self-draining join is formed between the first (10) and second (17) guide arrangement.

5. Conveyor according to claim 4, characterized in that the second guide arrangement (17) comprises a beam forming a substantial U profile, and in that said at least one second element (12b) of the clamping arrangement (12) has means (16) for supporting the U-beam with the outside of its base part directed towards the drainage gap (15).

6. Conveyor according to claim 5, characterized in that said at least one first element (12a) of the clamping arrangement has means (18) for securing an elongate safety element (19) which prevents insertion of fingers or the like into the drainage gap (15) but permits drainage, and which extends internally in the space between the beam sides (10a, 10b) along the whole of the drainage gap (15), at a short distance from it.

7. Conveyor according to one or more of the preceding claims, characterized in that the first element (12a) of said clamping arrangement is substantially wedge-shaped with external bearing surfaces lying against the inside surfaces of the beam sides provided with a seal (14).

8. Conveyor according to claim 7, characterized in that the second element (12b) of said clamping arrangement has, at one end, a recess corresponding to said external bearing surfaces (12a', 12") and, at the opposite end, said means (16) for supporting the U-profile beam (17) protecting the conveyor chain (11) in the return direction against contamination.

9. Conveyor according to claim 8, characterized in that the securing element (13) for clamping is a tensioning bolt arranged centrally in the wedge-shaped element (12a) and the complementary element (12b).

10. Connection piece for supporting chain-guide arrangement (10) in a conveyor for light goods, where said chain-guide arrangement comprises a pair of parallel elongate plate-shaped elements serving as beam sides (10a, 10b), characterized by:

a first element (12a) with external shape (12a', 12a") corresponding to a space between the beam sides (10a, 10b) which narrows in the direction towards a return chain-guide arrangement (17) in the conveyor concerned, and with an external part of said first element (12a) intended to bear directly or indirectly against the inside surfaces of the beam sides (10a, 10b), a second element (12b) which, at least partially adapted in shape, encloses said first element (12a) and, between itself and the first element, accommodates the pair of beam sides (10a, 10b), and a securing element (13) which is intended to tighten the first and second elements together and clamp the intermediate beam sides (10a, 10b) between them, and which is arranged substantially at right angles to the chain-supporting plane of the first guide arrangement (10).

11. Connection piece according to claim 10, characterized in that the first element (12a) of the connection piece is substantially wedge-shaped with external bearing surfaces (12a', 12a") lying against the inside surfaces of the beam sides provided with a seal (14).

12. Connection piece according to claim 11, characterized in that the second element (12b) of the connection piece has, at one end, a recess corresponding to said external bearing surfaces (12a', 12a"), and, at the opposite end, means (16) for supporting a U-profile beam (17) protecting the conveyor chain in the return direction against contamination.

13. Connection piece according to claim 12, characterized in that the securing element (13) for clamping is a tensioning bolt arranged centrally in the wedge-shaped element (12a) and the complementary element (12b).

* * * * *